United States Patent [19]
Hörl et al.

[11] Patent Number: 6,017,454
[45] Date of Patent: Jan. 25, 2000

[54] CENTRIFUGAL FILTRATION ONTO MEMBRANE ADSORBERS

[75] Inventors: Hans-Heinrich Hörl, Bovenden; Wolfgang Demmer; Dietmar Nussbaumer, both of Göttingen, all of Germany

[73] Assignee: Sartorius AG, Germany

[21] Appl. No.: 08/839,680

[22] Filed: Apr. 14, 1997

[30] Foreign Application Priority Data

May 3, 1996 [DE] Germany ............................ 196 17 775

[51] Int. Cl.[7] .................................................. B01D 63/16
[52] U.S. Cl. .................... 210/321.68; 210/365; 210/364; 210/403
[58] Field of Search .............................. 210/232, 321.67, 210/321.68, 321.74, 321.83, 359, 365, 367, 502.1, 360.1, 364, 402, 403, 657

[56] References Cited

U.S. PATENT DOCUMENTS

| | | | |
|---|---|---|---|
| 3,668,837 | 6/1972 | Gross | 55/158 |
| 4,137,177 | 1/1979 | Shoda | 210/403 |
| 4,547,289 | 10/1985 | Okano et al. | 210/652 |
| 5,022,988 | 6/1991 | Okarma et al. | 210/321.84 |
| 5,087,369 | 2/1992 | Tanimoto et al. | 210/635 |
| 5,403,482 | 4/1995 | Steere et al. | 210/489 |
| 5,538,630 | 7/1996 | Burns | 210/198.1 |
| 5,762,791 | 6/1998 | Deniega et al. | 210/321.67 |

*Primary Examiner*—W. L. Walker
*Assistant Examiner*—Terry K. Cecil
*Attorney, Agent, or Firm*—Chernoff, Vilhauer, McClung & Stenzel, LLP

[57] ABSTRACT

A filtration unit for the separation of substances from liquids utilizes a rotatable cylindrical module with a permeable wall disposed within a housing. A filter element which has at least one band of microporous membrane adsorber having a specific adsorption affinity for the substances to be separated is disposed within the cylindrical module so that the membrane absorber is abutted to the cylindrical module. The filter element encircles the feed inlet and can be in the form of an endless loop. A permeate plenum lies between the cylindrical module and the housing. The cylindrical module includes a liquid impermeable end cap which is provided with a coupling member adapted for connection to a drive of variable rotational speed.

9 Claims, 1 Drawing Sheet

CENTRIFUGAL FILTRATION ONTO MEMBRANE ADSORBERS

BACKGROUND OF THE INVENTION

Porous membrane adsorbers comprise membranes which carry functional groups, ligands or reactants on their inner and outer surfaces, and which are capable of interaction with at least one substance in a liquid phase which is in contact with the membrane. See, generally, PCT application Ser. No. 92/00805. Transport of the liquid phase through the membrane is induced by a pressure differential across the membrane. The term "membrane adsorber" is to be understood as a generic name for various kinds of membrane adsorbers such as membrane ion exchangers, ligand membranes, and activated membranes, each of which may be subclassified in accordance with specific types of functional groups, ligands, and reactants.

The separation of substances from a liquid phase by means of membrane adsorbers is conventionally carried out by directing the liquid phase bearing the substance to be separated to a feed inlet chamber of a filtration unit, and, by virtue of the pressure difference between the feed inlet and the membrane's permeate outlet, the liquid passes through the pores of the membrane adsorber layers. To heighten adsorption capacity, several sequential membrane adsorber layers are often employed, which are interposed between the feed inlet and the permeate outlet in such a manner that the liquid phase must sequentially pass through all the membrane adsorber layers. Corresponding to their specific adsorption, the individual substances to be separated become affixed to the inner or outer surfaces of the membrane adsorber layers, while the permeate freed from the removed substances is conducted out of the permeate chamber. The adsorbed substances on the membrane surfaces are then selectively desorbed and elutriated by suitable elutriation means.

Filtration units with several layers of porous membranes adsorbers arranged in the form of a membrane stack are known. See German Patent Nos. DE A1 38 04 430 and DE A1 44 32 628. However, their design calls for sealing the periphery of membrane adsorbers in the stack, which is expensive. Such edge sealing must be carefully done so that the liquid phase will be forced to pass through the membrane layers sequentially from the first feed side of the first layer through all the layers to the final permeate side surface of the last membrane layer. The edge sealings comprise either sealing compounds applied to the outer periphery of the membrane stacks or closure rings, i.e., plates which seal off the peripheral zones of the membrane stacks from the housing of the filtration unit, all to prevent any by-passing of the membrane adsorber layers. A further disadvantage of such a design is that the sealing of the membrane adsorber layers must be done by the manufacturer of the filtration unit, effectively preventing customization of the units and adsorber elements so as to be adaptable to the particular separation task at hand.

There is therefore a need in the art for a membrane adsorber filtration unit wherein no edge sealing is required, and which is readily adaptable to fit a desired separation, and which may be scaled up into production scale operations.

SUMMARY OF THE INVENTION

The present invention comprises a filtration unit for the selective separation and purification of substances from a liquid phase onto membrane adsorbers by centrifugation. The filtration unit comprises a housing, a cylindrical filter module rotatable about its longitudinal axis and having a permeable wall, a filter element disposed within the cylindrical module, and wherein the filter element comprises at least one band of microporous membrane adsorber. The unit has application in laboratory separations and in production processes, and has broad utility in the fields of environmental cleanup, biochemistry, gene technology, pharmaceuticals, chemistry, and the food and beverage industries. The unit is particularly suitable for the selective separation and purification of substances, which, in relation to membrane adsorbers, possess a specific adsorption affinity for, e.g., bio-specific molecules, proteins, enzymes, ions and heavy metals.

DETAILED DESCRIPTION OF THE PREFERRED EMBODIMENT

Figure 1:
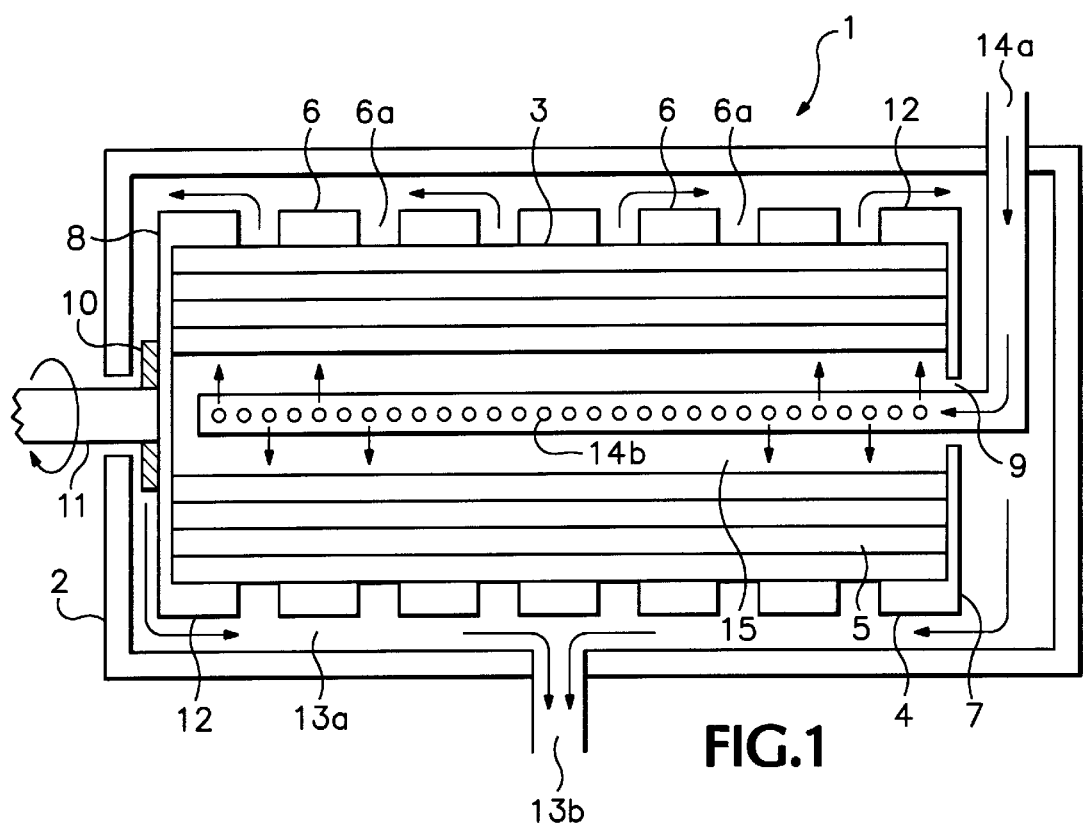
FIG. 1 is a cross-sectional schematic of an exemplary embodiment of the present invention.

According to the present invention there is provided a filtration unit comprising a housing with a feed inlet, a permeate plenum and a permeate outlet; a cylindrical filter module rotatable about its longitudinal axis, wherein the module has a cylindrical, liquid-permeable wall; and a filter element comprising at least one circumferential strip or band of microporous membrane adsorber.

Surprisingly, it has been found that, by virtue of rotation of the filter element, the resulting centrifugal forces are sufficient to press the membrane adsorber layers against the module wall in such a manner that a liquid phase introduced into the feed inlet of the filter element is compelled to pass sequentially through the pores of the successive microporous membrane adsorber layers and exit through the liquid-penetrable zone of the wall of the filter module as permeate. Equally surprising is the discovery that, notwithstanding the absence of any sealants on the edges of the adsorber membranes, no penetration or bypassing of the edge zone or periphery of the membrane adsorber layers by the liquid phase takes place, especially when care has been taken that the periphery at least partially overlaps the non-penetrable zone of the sidewall. Because the filtration unit is provided completely without any sealing substance within the membrane adsorber layers or between the said membrane adsorber layers and the housing of the filter element, membrane adsorber layers may be changed quickly without the use of tools.

The adsorption capacity of the filter element may be varied by varying the number of wraps of the membrane adsorber band(s). Through the use of various types of membrane adsorber bands, different substances can be simultaneously separated from the liquid phase by a single centrifugation, and then elutriated individually. Membrane adsorber flux can also be varied over wide ranges by changes in the RPM of the centrifuge. However, the RPM must be so chosen, that the dwell time in the membrane adsorber layers of the substance to be removed is sufficiently great that proper adsorption equilibrium can be established between the substance to be removed and the membrane adsorber.

The filter element may also be a prefabricated spiral-wound membrane or a membrane belt or endless loop. For ease of changeability of the filter element, tension clips may be employed at the ends of the filter housing so as to permit easy removal of the end caps of the cylindrical filter housing.

Turning to the drawing, FIG. 1 shows a filtration unit 1 comprising a housing 2 with a rotationally symmetric, cylindrical filter element 3 which is rotatable about its longitudinal axis. The cylindrical filter element 3 is disposed within a cylindrical filter module 4, also symmetrical and rotatable about its longitudinal axis. Filter element 3 most preferably comprises a spiral-wound membrane 5. The module 4 preferably consists of a tubular element 6 having permeate outlet openings 6a therein which are in fluid communication with permeate plenum 13a and ultimately with permeate outlet 13b. Tubular element 6 is connected to end caps 7 and 8 in a liquid-tight manner so as to form a cylinder, and end cap 7 has a central rotationally symmetric opening 9, while end cap 8 is fitted with a coupling 10 for connecting to a rotational drive 11. End cap 7 is preferably detachable from tubular element 6, being secured thereto by a friction fit, for example.

By virtue of the permeate outlet openings 6a therein, with the exception of the edge zones 12, tubular element 6 is permeable to liquids without significant resistance. Spiral-wound membrane 5 comprises at least one band or belt of surface active membrane, preferably a microporous membrane adsorber. The band(s) must be of sufficient width to completely cover the permeable zone of cylindrical module 4, and must have a total length which is greater than the inner circumference of the module. When endless loops are employed as the membrane adsorber bands, their outer circumference must correspond to the inner circumference of the band nearest the tubular element 6, while the outer circumference of such an endless loop, which is immediately adjacent the wall of tubular element 6 will correspond to the inner circumference of the side wall.

To separate substances from a liquid phase, end cap 7 may be removed to insert a membrane adsorber in the form of a spiral-wound membrane 5 abutting the inner circumferential wall of cylindrical module 4 in such a manner that a multiplicity of membrane adsorber layers may overlap. Care is to be taken to ensure that the entire permeable zone of the wall of cylindrical module 4 is covered by at least one membrane adsorber layer. When end cap 7 is secured to tubular element 6, spiral-wound membrane or membrane adsorber belts alternatively may be inserted into module 4 through axial opening 9 if the same has been constructed large enough.

In operation, centrifugal force presses the membrane adsorber layers against the cylindrical wall of module 4 in such a manner that a liquid fed into the filtration unit through feed inlet opening 14a will sequentially pass through all the pores of all adjoining membrane adsorber layers 5 and flow through permeate outlet openings 6a into permeate plenum 13a as permeate, ultimately exiting the filtration unit through permeate outlet 13b. Rather surprisingly, in those portions of the membrane adsorber layers which abut the impermeable edge areas 12 of the module, no permeation or bypassing of the membrane is evident.

The liquid phase feed may be fed to axial feed-receiving chamber 15 via feed inlet 14a and thence to the filter element 3 by means of a manifold 14b, for example, in the form of a perforated tube, which may extend for the entire length of the filter module.

EXAMPLE

The filter element employed in the following demonstration was a 4-cm-wide commercially available spiral-wound ion-exchange microporous membrane adsorber (SARTOBIND S, Sartorius AG) having an outside diameter of 14 cm and an inside diameter of 13 cm. The filter element was inserted into a module of a filtration unit of substantially the same design shown in FIG. 1 and spun with a variable speed electric motor.

Chicken egg albumen was mixed with a 10-part volume of 10 mM sodium acetate buffer to maintain a 5.5 pH and the insoluble protein was separated by prefiltration. This solution (150 ml) comprised the liquid phase feed, which was directed to feed-receiving chamber 15 of the filter module. By centrifugal force the solution was distributed evenly over the surface of the innermost membrane adsorber layer and sequentially penetrated all membrane adsorber layers of the spiral-wound filter from innermost to outermost, and was removed as permeate from the filter centrifuge. As a result of this filtration, two principal proteins of chicken egg albumen, namely, lysozyme and conalbumin were bonded to the strongly acid membrane ion-exchange membrane. Next, buffer solution was introduced to the filtration unit and centrifuged to remove non-ionized bound protein and other substances from the filter element. Finally, ionically bound protein was desorbed in similar fashion with a solution of 1 M buffered potassium chloride.

For all fractions (exit solution, permeate, wash permeate, and eluate following the desorption) the protein content was determined in accordance with the method disclosed by Bradford in 72 *Anal. Biochem.* 248 (1976) and found to be 95% of the ionically-bound protein theoretically recoverable. These results were compared with the outcome of substantially the same separation carried out by a dead-end filtration unit of the design described in German Patent No. DE A1 44 32 628, wherein the membrane adsorber layers of a membrane stack were made fluid-tight on their periphery by a sealant, and found to be comparable.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A filtration unit for the separation of substances from liquids comprising:
   (a) a housing with a feed inlet, a permeate plenum and a permeate outlet;
   (b) a cylindrical module rotatable about its longitudinal axis and disposed within said housing and having a liquid permeable wall having outer and inner sidewalls;
   (c) a filter element disposed within said cylindrical module and comprising at least one band of microporous membrane adsorber, said membrane adsorber having a specific adsorption affinity for said substances to be separated and abutting said liquid permeable wall, there being no sealant between said membrane adsorber and said housing; and
   (d) said outer sidewall being adjacent said housing and said inner sidewall abutting said adsorber
   wherein said permeate plenum is located between the wall of said housing and the exterior of said module.

2. The filtration unit of claim 1 wherein said filter element is in the form of an endless loop and has a composite length greater than the inner circumference of said cylindrical module.

3. The filtration unit of claim 1 wherein said filter element is replaceable.

4. The filtration unit of claim 1 wherein said liquid-permeable wall of said cylindrical module has openings therein that allow permeate to pass into said permeate plenum.

5. The filtration unit of claim 4 wherein said permeate plenum is in fluid communication with said permeate outlet.

6. The filtration unit of claim 1 wherein said feed inlet is in axial fluid communication with said cylindrical module.

7. The filtration unit of claim 6 wherein said filter element encircles said feed inlet.

8. The filtration unit of claim 1 wherein said cylindrical module comprises a tubular section with holes about its circumference and a first liquid-impermeable end cap and a second liquid-impermeable end cap.

9. The filtration unit of claim 8 wherein said first end cap is provided with a coupling member adapted for connection to a drive of variable rotational speed and said second end cap is provided with an axial opening to accommodate said feed inlet.

* * * * *